No. 735,260. PATENTED AUG. 4, 1903.
G. HUHN.
AUTOMATIC LUBRICATING PACKING RING FOR STUFFING BOXES.
APPLICATION FILED JULY 8, 1902.
NO MODEL. 3 SHEETS—SHEET 1.
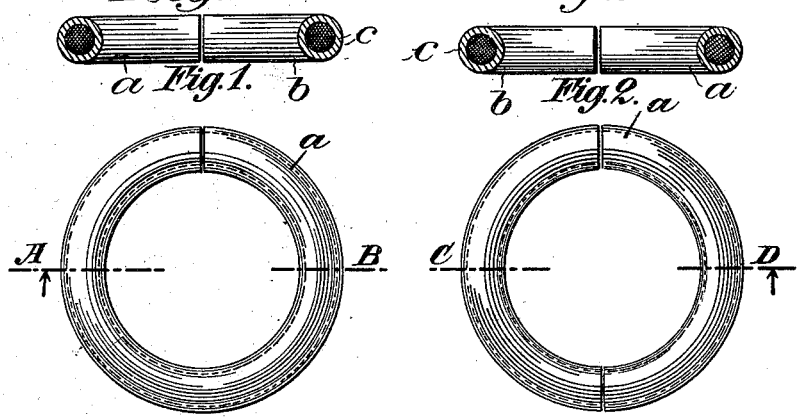
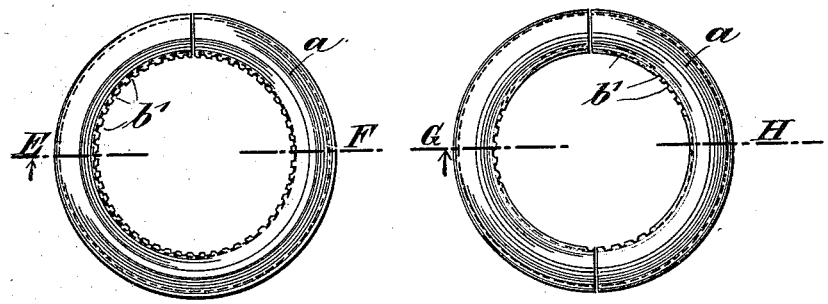
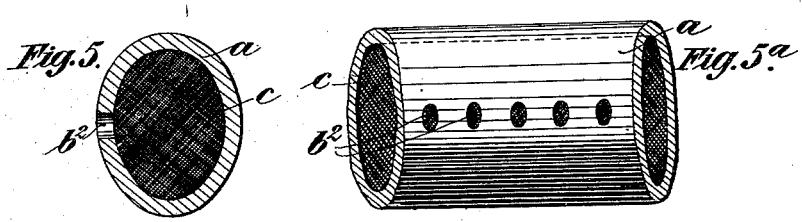

No. 735,260. PATENTED AUG. 4, 1903.
G. HUHN.
AUTOMATIC LUBRICATING PACKING RING FOR STUFFING BOXES.
APPLICATION FILED JULY 8, 1902.
NO MODEL. 3 SHEETS—SHEET 2.
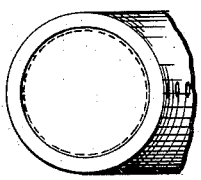
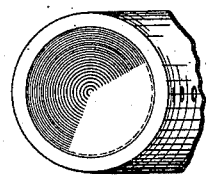
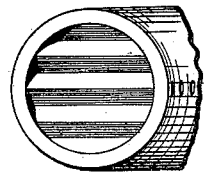
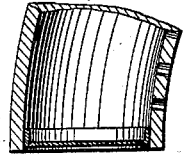
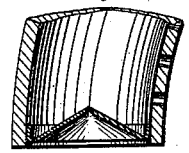
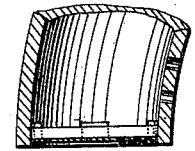
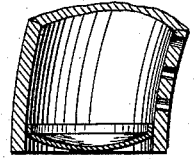
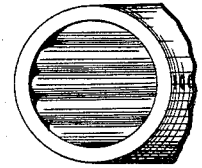
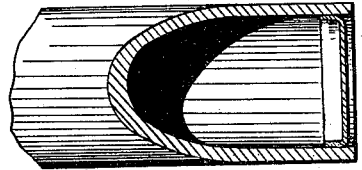
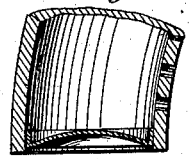
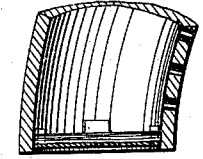
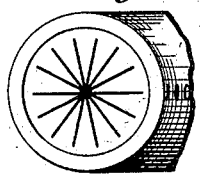
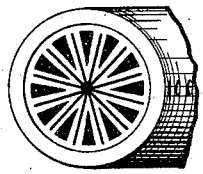
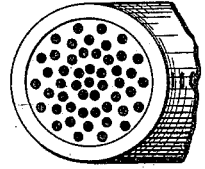
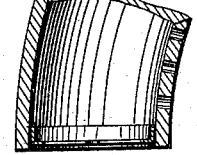
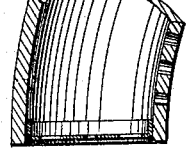
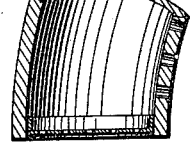

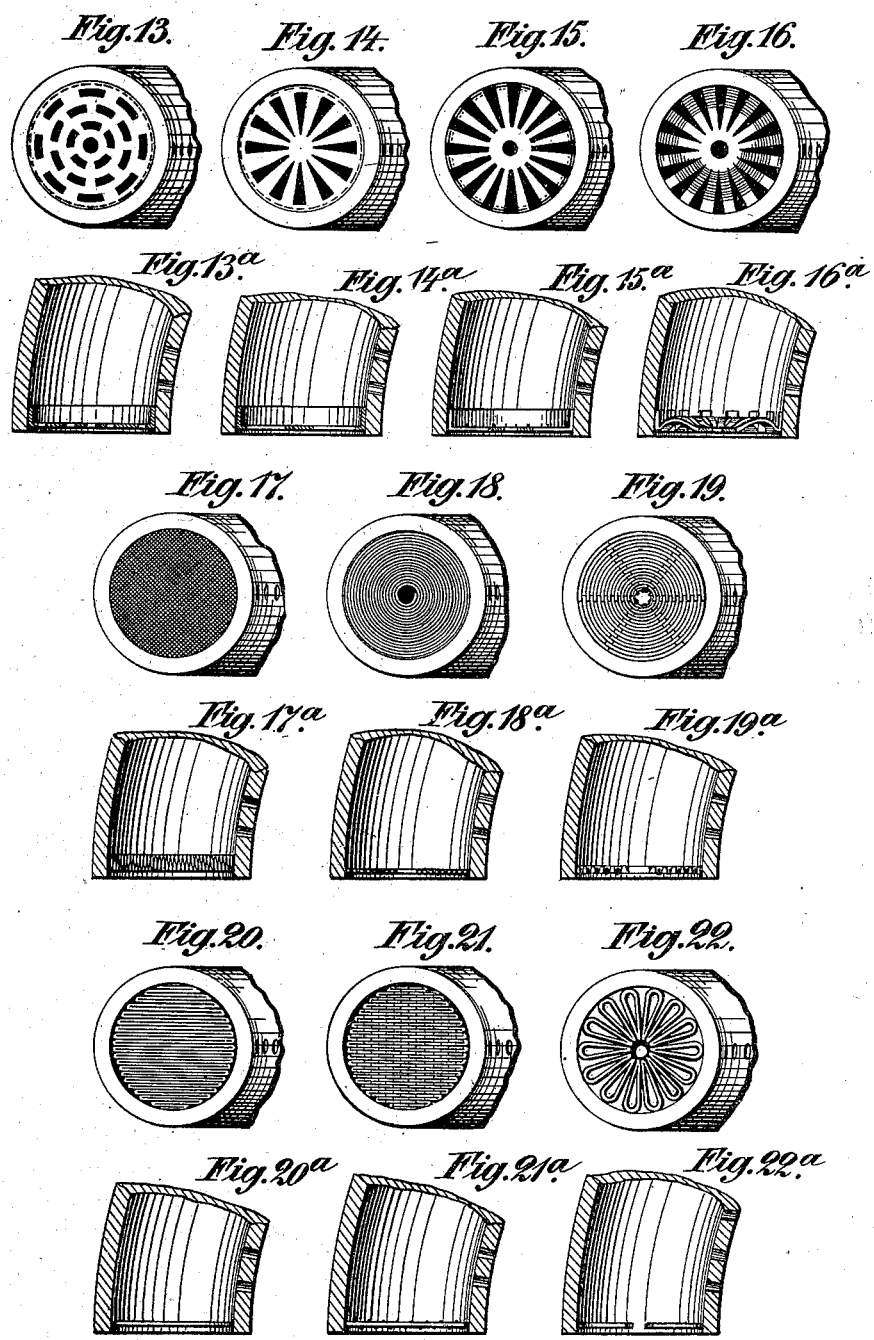

No. 735,260. Patented August 4, 1903.

UNITED STATES PATENT OFFICE.

GUSTAV HUHN, OF BERLIN, GERMANY.

AUTOMATIC LUBRICATING PACKING-RING FOR STUFFING-BOXES.

SPECIFICATION forming part of Letters Patent No. 735,260, dated August 4, 1903.

Application filed July 8, 1902. Serial No. 114,841. (No model.)

*To all whom it may concern:*

Be it known that I, GUSTAV HUHN, merchant, a subject of the King of Prussia, Emperor of Germany, residing at Cuxhavenerstrasse 15, Berlin, in the Kingdom of Prussia and Empire of Germany, have invented certain new and useful Improvements in Automatic Lubricating Packing-Rings for Stuffing-Boxes, of which the following is a full, clear, and exact description.

The object of the invention is to provide an automatic packing-ring for stuffing-boxes, especially for that class which are heated to a very high temperature, as is the case in gas-engines, hot-air motors, &c. In stuffing-boxes of the kind mentioned, which are subjected to a very high degree of temperature, the self-lubricating material hitherto known and used is generally burned, which is the case where hemp strings are used for packing. These disadvantages are overcome by my invention, as a ring is provided which is composed of a hollow body having one or several parts or sections and provided with perforations. The material of which the hollow body is made is composed of an alloy of lead and copper, the hollow space of the ring being filled with flakes of graphite. The feeding of the lubricating material is effected through the perforations or holes on the inner surface of the packing-ring. The feeding of the lubricating material is prevented at the points where the ends of the ring meet by a closing device. The right composition of the alloy forming the body of the hollow ring is very important, so that the packing-ring will perform its functions properly. It is of advantage to give the ring, which is comparatively costly, a long life. If, for instance, the hollow ring-body is made of pure lead, the ring would be rapidly compressed by the initial pressure of the stuffing-box, and such rings are of imperfect resistance against the excoriations caused by the piston-rod moving on the inner surface of the packing-ring with great velocity. The small resistancy of pure lead is well know under the term "adhesive power" and is the more marked as the temperature rises to which the lead is heated. By this adhering of the lead many drawbacks are involved, as the packing-rings become unfit for use and the piston-rods are sometimes stopped and damaged, and, moreover, the use of such packing-rings cause interruptions to business which involve a loss of time and money. To obviate this interruption, I provide a packing-ring having the hollow body of the packing-ring constructed out of an alloy of lead and copper, so that even after being used for a long period of time it still remains effective. The closing device for the meeting ends of the ring, it is to be noted, offers several advantages, not only as a closing device for the ends of the rings, but likewise in the manipulation of placing and replacing the packing-ring in the stuffing-boxes. Packing-rings which are not provided with said closing device often lose that part of the lubricating material which is adjacent to the meeting ends of the rings in such a manner that not only a part of the lubricating material is lost entirely, but the feeding of the lubricant through the perforations of the ring does not take place until a short time after the compression of the hollow ring begins, as the quantity of the lubricant is proportionally diminished by the said circumstances.

It often happens that the abutting ends of the packing-rings in the stuffing-boxes are not touching each other, but leave a space through which the lubricant can feed in a greater quantity than is desired. A trial has been made of covering the apertures of the ends of the rings with stoppers of lead and the like; but this manner of closing the ends has disadvantages, as the ring becomes considerably harder at the meeting ends than in all other parts—*i. e.*, it offers an unequal resistance to being compressed. The closing device according to the present invention is constructed in such a manner that it yields on a certain pressure being exerted on the ring, as well as the whole hollow body of the ring filled with the lubricant.

The manner of the formation and mounting of the closing device of the packing-ring prevents the ring from being deformed or damaged by excoriations of the piston-rod.

With the foregoing and other objects in view the invention consists in the details of construction and in the arrangement and combination of parts to be hereinafter more fully set forth and claimed.

In describing the invention in detail reference will be had to the accompanying drawings, forming part of this specification, wherein like characters denote corresponding parts in the several views, and in which—

Figures 1 and 1ª show a plan view or a diametrical section, respectively, of a single divided packing-ring provided with a feeding-slot for the lubricant. Figs. 2 and 2ª show corresponding views of a packing-ring divided at two opposite points. Figs. 3 and 3ª show views of a single divided packing-ring, as in Figs. 1 and 1ª, having small perforations for the feeding of the lubricant. Figs. 4 and 4ª show similar views as Figs. 2 and 2ª of a packing-ring divided into two parts and having a series of small perforations in an undulating line. Fig. 5 shows a vertical section through a packing-ring having an elliptical cross-section. Fig. 5ª shows a sectional side view of a packing-ring constructed according to Fig. 5 with elliptical-shaped perforations. Figs. 6 to 22 show the necessary supplemental figures in various views showing the formation of the closing device for the abutting ends in several modifications.

The construction of the packing-ring according to Figs. 1 and 1ª shows a hollow body $a$ of a cross-section as represented in Fig. 1ª. The body $a$ is divided at one point and is provided with a narrow slot extending around surface of the ring, and the interior of the ring is filled with flakes of graphite $c$. The abutting ends of the packing-ring are provided with a closing device according to the corresponding supplemental Figs. 6 to 22.

Figs. 2 and 2ª show a packing-ring similar to that of Figs. 1 and 1ª, with the difference that it is divided at two points diametrically opposite to each other, thereby forming two semicircles. For this reason there are four closing devices according to Figs. 6 to 12 or the corresponding supplemental figures.

The ring according to Figs. 3 and 3ª only differs from that shown in Figs. 1 and 1ª by the fact that it is provided on its inner surface with a series of holes $b$ instead of a narrow slot. By means of the holes the feeding of the lubricant $c$ from the hollow body of the ring is effected in a manner more uniform and certain than by the slot $b$ according to Figs. 1 and 1ª and 2 and 2ª.

The ring represented by Figs. 4 and 4ª is made in two parts, as that of Figs. 2 and 2ª, and has on its inner side a series of feeding-holes for the lubricant $c$. The characteristic feature of this construction consists in arranging the holes $b$ in a wave or undulating line. This construction is on account of the fact that in compressing the packing-ring successively other parts of its inner surface come in contact with the piston-rod.

The elliptical cross-section represented by Figs. 5 and 5ª has for its purpose to increase the duration of life of the packing-ring, for it is obvious that an initial pressure in the direction of the longer axis can be exerted for a greater period of time than if the hollow body of the packing-ring is shaped according to Figs. 3 and 3ª, respectively. The shape of the feeding-holes $b^2$, as illustrated in Figs. 5 and 5ª, is based on the same principle. The object is to close up the holes $b^2$ after having compressed the ring for a long period of time.

For producing the material from which the hollow ring-body is made is as follows: I add to pure lead, which melts at 330° centigrade, a small quantity of copper, the melting-point of which is 1,000° centigrade, the quantity of copper being more or less great, as the case demands—i. e., whether the pressure be exerted is more or less strong or whether the stuffing-boxes be influenced by a high or low degree of temperature when provided with the new packing-material. I preferably employ additions of copper four per cent. and eleven per cent. The alloy generated in this manner melts at from 300° to 400° centigrade. The latter temperature is seldom met with in stuffing-boxes. If this temperature is exceeded in unusual cases, I increase the addition of copper to fifty per cent. The results of my experience show that an alloy formed in such a manner melts at 1,500° centigrade. In this case a difference from the common-known melting-point of alloys must be stated, inasmuch as the melting-point of an alloy consisting of equal parts of lead and copper is theoretically assumed somewhat lower than I have stated it to be. Such differences of melting-points have hitherto not yet been proved by theory. Such alloys seem to be subject to certain laws in which the manner of the composition is of substantial influence. It has already been remarked that the alloy having four per cent. of copper melts at 300° centigrade, whereas pure lead melts at 330° centigrade. If the proportion of fifty per cent. to fifty per cent. is passed, the melting temperature is lowered according to my statements. It has been stated that an alloy of twenty-five per cent. lead and seventy-five per cent. copper melts at 900° centigrade. If the alloy of four per cent. mentioned melts at 300° centigrade, it is still practical to insert such rings in stuffing-boxes which are not subjected to a very high degree of heat. This deduction is based on the principle that the addition of four per cent. of copper substantially varies the structure of the lead in such a manner that the alloy is not adhesive to such a degree as the pure lead would be when subjected to a strong friction or high degree of temperature. The structure of the alloy is still more compacted if an addition of copper of eleven and one-half per cent. is chosen. The hollow ring-bodies formed of such alloy have a considerable resistance against excoriation and compression without being effectively hard. The rings can therefore be used a long period of time before becoming flat.

The composition of the alloy must be suitable to the special purpose of the employment of the packing-ring. Generally alloys combining four or eleven and one-half per cent. of copper are sufficient.

The several modifications of the closing device, as illustrated on the annexed drawings, show the packing-ring before described. The first group, containing Figs. 6 to 16ª, show the sheets or covers consisting of a thin tinplate, (preferably sheets of lead or tin of one-fourth millimeter thickness,) which are inserted into the packing-rings by clamping or soldering. According to Figs 6 to 6ᶜ, 7, and 7ª these sheets are formed with plane, convex, concave, or funnel-shaped surfaces, whereas according to Figs. 8, 8ª, 9, and 9ª they are constructed with surfaces in a wave-like or zigzag shape. It is preferable to form such covers with short flanges, as shown in Fig. 9ᵇ, so as to secure the cover to the ring. In Figs. 10, 10ª the said main part is radially slotted in such a manner that separate tongues are formed, which can be bent over in compressing the packing-ring in the necessary manner.

The modification of the segment - like tongues, as shown in Figs. 11 and 11ª, can be constructed by means of holes, so that they can be easily bent over at the point where they contact with the inner surface of the ring. The holes are so proportioned that the lubricant cannot pass through them without pressure.

Figs. 12 to 14ª show modifications of the several cover-sheets with various perforations, through which the lubricant can pass when pressure is applied to the packing-ring. These modifications have the advantage, as shown by Figs. 11 to 12ª, that the compression of the packing-ring effects the feeding of the lubricant at the abutting ends of the ring.

Figs. 15 to 16ª show two modifications of soft-metal cover-sheet, being star-like perforated and having a continuous flange at each end of the star. Such sheet covers can be formed without the continuous flange, in which case the outer ends of the star are directly soldered to the inner wall of the packing-ring.

Figs. 18 to 22ª show a closing device formed of lead, tin, or of wire of alloy. The modifications according to Figs. 18 to 19ª are formed by spirally-wound wire, in which case the angular circles are connected together either by a galvanic deposition (acting as a weak solder) or by an exceedingly weak supplemental wire, by means of which the spiral-wound wire is formed into a gauze like that of the bottom of a basket.

Figs. 20 to 21ª show a wire covered by a galvanic deposition and bent in a zigzag line successively increasing and decreasing in length, the said wire in Fig. 21 being formed into a gauze by a supplemental wire, as above described. Figs. 22, 22ª show a wire which is bent in a star-like shape.

Instead of metal being used for the closing device any other material being of great resistance against steam and heat can be used—as, for instance, asbestos in the shape of plates or gauze.

Having fully described my invention, what I claim as new, and desire to secure by Letters Patent, is—

1. In an automatic packing-ring for stuffing-boxes, a hollow ring-body provided with openings, flakes of graphite for filling the interior of the ring-body, a closing device for the abutting ends of the hollow ring-body, said closing device having means for permitting the lubricant to feed to the piston-rod substantially as described.

2. In a device of the character described, a hollow ring-body having openings in its inner surface, flakes of graphite for filling the hollow ring-body, a closing device consisting of wire soldered to the edges of the ring, said closing device having means for permitting the lubricant to come in contact with the piston-rod.

3. In an automatic packing-ring for stuffing-boxes, a hollow metal ring-body composed of lead and copper, a lubricant for filling the hollow ring-body, means whereby the lubricant is permitted to feed to the piston-rod from the interior of the hollow ring-body, a closing device for the abutting ends of the hollow ring-body, said closing device having means for permitting the lubricant to contact with the piston-rod.

4. In an automatic packing-ring for stuffing-boxes, a hollow body composed of lead and copper alloy, and having a series of apertures whereby the lubricant is permitted to feed to the piston-rod; a closing device consisting of wire fastened to the edges of the packing-ring by means of a flange.

5. In an automatic packing-ring for stuffing-boxes, a hollow ring-body filled with flakes of graphite having apertures in its inner surface whereby the lubricant is fed to the piston-rod and a closing device for the abutting ends of the hollow ring-body consisting of strands of wire secured to the edges of the hollow ring-body and having cross-strands secured to the first-named strands by a galvanic deposition, substantially as described.

In witness whereof I subscribe my signature in presence of two witnesses.

GUSTAV HUHN.

Witnesses:
HENRY HASPER,
WOLDEMAR HAUPT.